(12) United States Patent  (10) Patent No.: US 7,464,915 B2
Liu et al.  (45) Date of Patent: Dec. 16, 2008

(54) BINDING DEVICE

(76) Inventors: Kwang Wang Liu, 2F, No. 7, Lane 76, Bao-An St., Sindian City, Taipei County 231 (TW); Ko-Chin Shiao, No. 18, Ji-An St., Taoyuan City, Taoyuan County 330 (TW)

( * ) Notice: Subject to any disclaimer, the term of this patent is extended or adjusted under 35 U.S.C. 154(b) by 0 days.

(21) Appl. No.: 11/784,247

(22) Filed: Apr. 5, 2007

(65) Prior Publication Data

US 2008/0244883 A1  Oct. 9, 2008

(51) Int. Cl.
*B21F 9/00* (2006.01)
*B25B 25/00* (2006.01)

(52) U.S. Cl. .................................... 254/217; 254/214

(58) Field of Classification Search .............. 254/213, 254/214, 217, 223; 24/68 CD, 909; 74/575
See application file for complete search history.

(56) References Cited

U.S. PATENT DOCUMENTS

| | | | | |
|---|---|---|---|---|
| 4,155,537 A * | 5/1979 | Bronson et al. | .......... | 242/388.3 |
| 4,530,135 A * | 7/1985 | Hsiang | .......... | 24/68 CD |
| 5,904,341 A * | 5/1999 | Norrby | .......... | 254/243 |
| 6,095,450 A * | 8/2000 | Jang | .......... | 242/388.5 |
| 6,457,701 B1 * | 10/2002 | Huang | .......... | 254/217 |
| 6,524,041 B1 * | 2/2003 | Voiculescu | .......... | 410/100 |
| 6,547,218 B2 * | 4/2003 | Landy | .......... | 254/217 |
| 6,648,301 B2 * | 11/2003 | Lee | .......... | 254/218 |
| 6,808,164 B2 * | 10/2004 | Chang | .......... | 254/217 |
| 6,880,810 B1 * | 4/2005 | Hu | .......... | 254/218 |
| 7,100,901 B2 * | 9/2006 | Gleinser | .......... | 254/218 |
| 2006/0261204 A1 * | 11/2006 | Ruan | .......... | 242/388.4 |

* cited by examiner

*Primary Examiner*—Evan H Langdon
(74) *Attorney, Agent, or Firm*—Pro-Techtor Int'l Services

(57) ABSTRACT

A binding device for pulling tight a belt comprises a first ratchet wheel and a second ratchet wheel, each having a plurality of mounting openings, a roll, having a plurality of roll sectors that are respectively mounted in the mounting openings of the first and second ratchet wheels, of which at least one roll sector is removable, a lever, connected with the first ratchet wheel, a frame, connected with the second ratchet wheel; an upper blocking assembly, mounted on the lever, blocking the first ratchet wheel from turning, and a lower blocking assembly, mounted on the lever, blocking the second ratchet wheel from turning. Due to removability of one of the roll sectors, the belt is easily mounted and dismounted, and a wide range of applications is provided for.

2 Claims, 5 Drawing Sheets

BINDING DEVICE

FIELD OF THE INVENTION

The present invention relates to a binding device, particularly to a binding device which has a roll with separable roll sectors, so that easy mounting and dismounting of a belt is achieved, and which allows for a wider range of applications.

BACKGROUND OF THE INVENTION

As shown in FIG. 5, a conventional binding device 1a is used to pull tight a belt assembly for fixing and securing a load on a vehicle. More specifically, the binding device 1a is used to pull together connecting ends of upper and lower belts 10a, 12a, with engaging elements 14a, 16a on far ends thereof, e.g. hooks or rings, which engage with fixed counterelements, e.g. hooks on the vehicle. The binding device 1a comprises: two ratchet wheels 2a, surrounding central holes 21a; a roll 3a, mounted on two ends thereof in the central holes 21a and having a longitudinal slit 31a, into which the upper belt 10a is inserted; a lever 4a, shaped like the letter U, having a lower end with an opening that is fixed on one of the ratchet wheels 2a and the roll 3a and having an upper end with a handle 43a for manually lifting the lever 4a; a frame 5a, shaped like the letter U, having a connecting end fixed on another of the ratchet wheels 2a and having a free end to which the lower belt 12a is fastened; and upper and lower blocking assemblies 6a, 7a. The upper blocking assembly 6a comprises: an upper blocking element 61a, shaped like the letter U and mounted on a middle section of the lever 4a, transversally glidable thereon and in a first blocking position thereof blocking one of the ratchet wheels 2a from turning back; a spring 63a, at a front end pushing the upper blocking element 61a towards the first blocking position; and a spring support 65a, mounted on the lever 4a and supporting a rear end of the spring 63a. The lower blocking assembly 7a comprises: a lower blocking element 71a, shaped like the letter U and mounted on a middle section of the frame 5a, transversally glidable thereon and in a second blocking position thereof blocking one of the ratchet wheels 2a from turning back; a spring 73a, at a front end pushing the lower blocking element 71a towards the second blocking position; and a spring support 75a, mounted on the frame 5a and supporting a rear end of the spring 73a. For using the binding device 1a, the lever 4a is repeatedly pushed towards the frame 5a and pulled away therefrom, so that the belts 10a, 12a are pulled together with great force due to a lever effect and at the same time prevented from loosening, so that cargo on a vehicle is fixed and secured.

For securing cargo, binding devices as described above play an important role. However, since the slit 31a has to accommodate connecting ends of upper belts of various width, the latter are in many cases not laterally fixed. Furthermore, for binding cargos of great variety, long upper belts are usually used, so that often long connecting ends have to be pulled through the slit 31a, while the upper and lower blocking elements 61a, 71a have to be kept from blocking the ratchet wheels 2a, wasting time.

SUMMARY OF THE INVENTION

It is an object of the present invention to provide a binding device which allows for fast and convenient mounting and dismounting of belts.

Another object of the present invention is to provide a binding device which has a wider range of applications.

Other aspects and advantages of the present invention will become apparent from the following detailed description, taken in conjunction with the accompanying drawings, illustrating by way of example the principles of the present invention.

DESCRIPTION OF THE PREFERRED EMBODIMENTS

Figure 1:
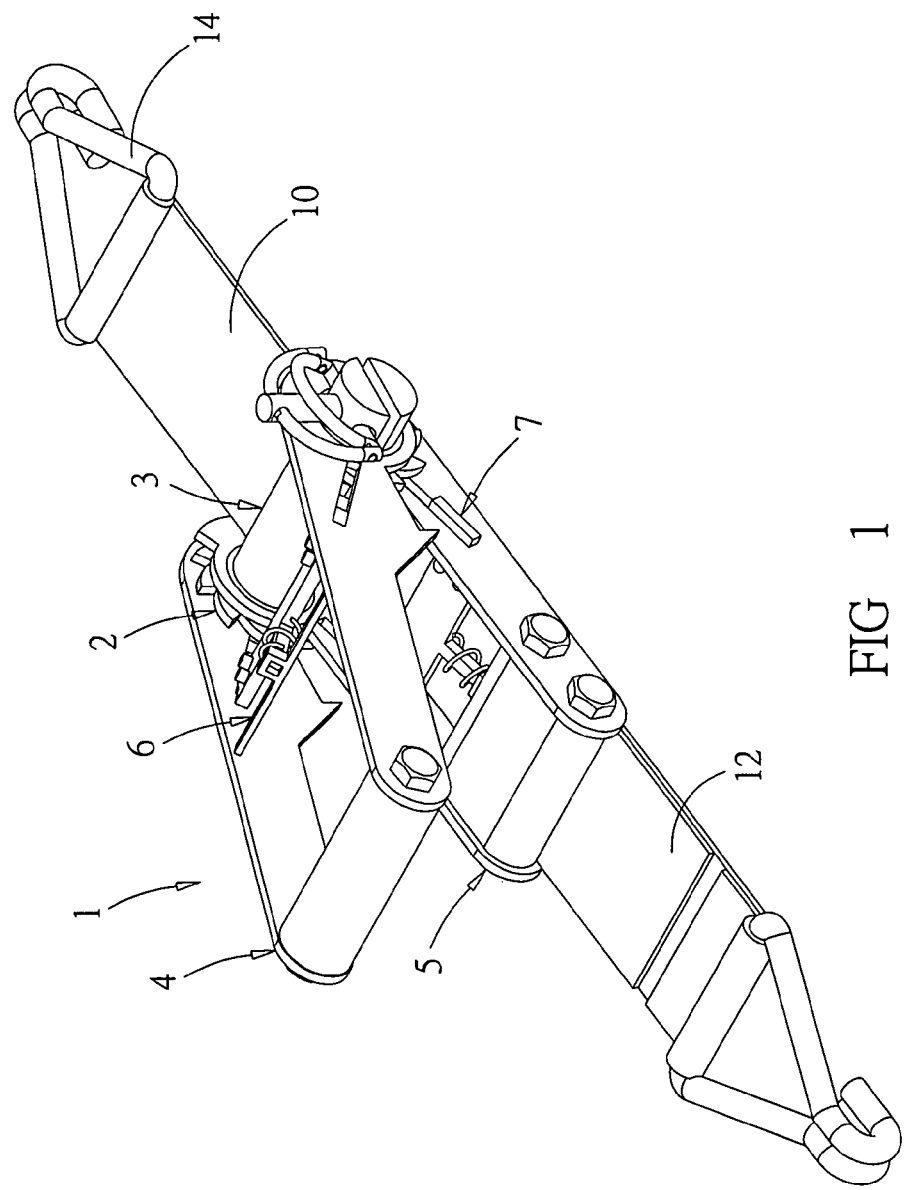
FIG. 1 is a perspective view of the binding device of the present invention.
Figure 2:
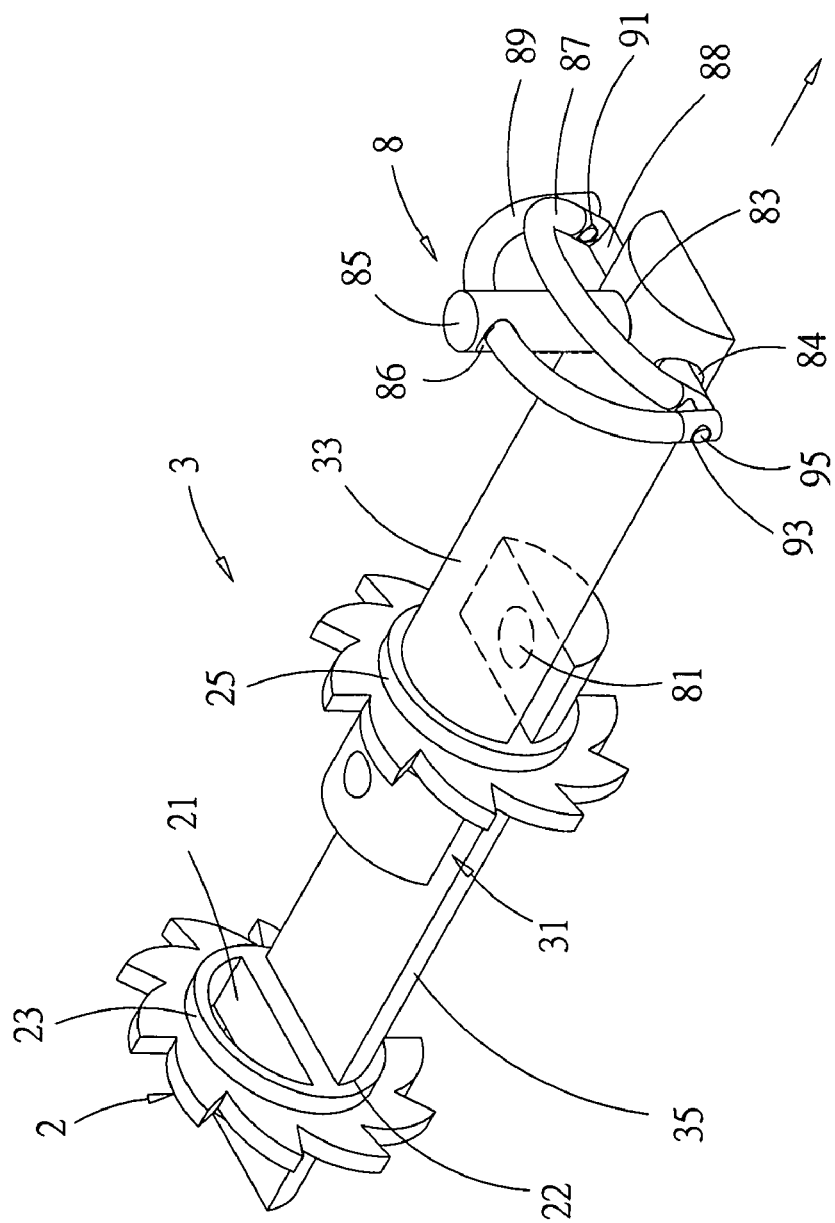
FIG. 2 is a schematic illustration of the ratchet wheels and roll of the present invention.

As shown in FIGS. 1 and 2, the binding device of the present invention is used to pull together connecting ends of upper and lower belts 10, 12, comprising a lever 4, a frame 5, and upper and lower blocking devices 6, 7. The binding device of the present invention is characterized by further comprising ratchet wheels 2 with inner and outer peripheries, carrying inner and outer protrusions 23, 25, respectively, which form an axis of a movement of the lever 4 and the frame 5 against each other. A roll 3 of varying width is set on the inner and outer protrusions 23, 25, thereby readily being replaceable, so that the upper belt 10 is quickly inserted or pulled out. In the following, a detailed description is given.

Each of the ratchet wheels 2 has a plurality of mount openings 21, 22, in which a first roll sector 33 and a second roll sector 35 are mounted. There are two or more mount openings and roll sectors, the present text uses two as an example.

The roll 3 comprises the first roll sector 33, the second roll sector 35, and a fixing assembly 8. The first roll sector 33 is mounted in the mount opening 21, having a free end, and is removable to allow for inserting of the upper belt 10. The second roll sector 35 is mounted in the mount opening 22, having a free end. A gap 31 lies between the first and second roll sectors 33, 35. The fixing assembly 8 comprises: a transverse hole 84, passing through the free end of the first roll sector 33; a first fixing hole 83, passing through the free end of the first roll sector 33, oriented perpendicularly to the transverse hole 84; a second fixing hole 81, passing through the free end of the second roll sector 33 and aligned with the first fixing hole 83 when the first roll sector 33 is inserted in the mount opening 21; two first pins 88, entering the transverse hole 84 from opposite ends thereof; a handle 87, shaped like the letter U and having ends to which the first pins 88 are respectively attached, so that the first roll sector 33 is readily manually moved, furthermore having lever holes 91 close to the ends thereof; a connecting piece 89, shaped like the letter U and having ends with end holes 93, through which second pins 95 pass, which in turn pass through the lever holes 91; and a bolt 85, passing through the first fixing hole 83 of the first roll sector 33 and having a free end with a mounting hole 86, passed through by the connecting piece 89. Moving the handle 87 towards the first roll sector 33 drives a movement of the connecting piece 89, pushing the bolt 85 deeper into the first fixing hole 83 and finally into the second fixing hole 81 of the second roll sector 35. Then the first and second roll sectors 33, 35 are connected to each other. Moving the handle 87 away from the first roll sector drives an opposite movement of the connecting piece 89, pulling the bolt 85 out of the first fixing hole 83, so that the bolt 85 leaves the second fixing hole 81 of the second roll sector 35. Then the first roll sector 33 is longitudinally removable. Thereby, mounting and dismounting of the upper belt 10 is quickly and easily performed.

Since there is no need to pass the upper belt through the gap 31, engaging elements 14 (not shown) are attached without restriction, and mounting and dismounting times are reduced.

The present invention is also applicable to a single belt with engaging elements on opposite ends thereof. For usage, one end of the belt is fixed and wound around cargo to be secured, an opposite end is fixed, and a middle section is fold and inserted into the gap between the roll sectors and pulled tight by repeatedly moving the lever and the frame against each other (not shown).

Each of the roll sectors 33, 35 of the roll 3 is designable to be removable (not shown).

The roll sectors 33, 35 are realizable with any cross-sections, the semi-circular cross-sections shown in the Figs. being examples.

Figure 3:
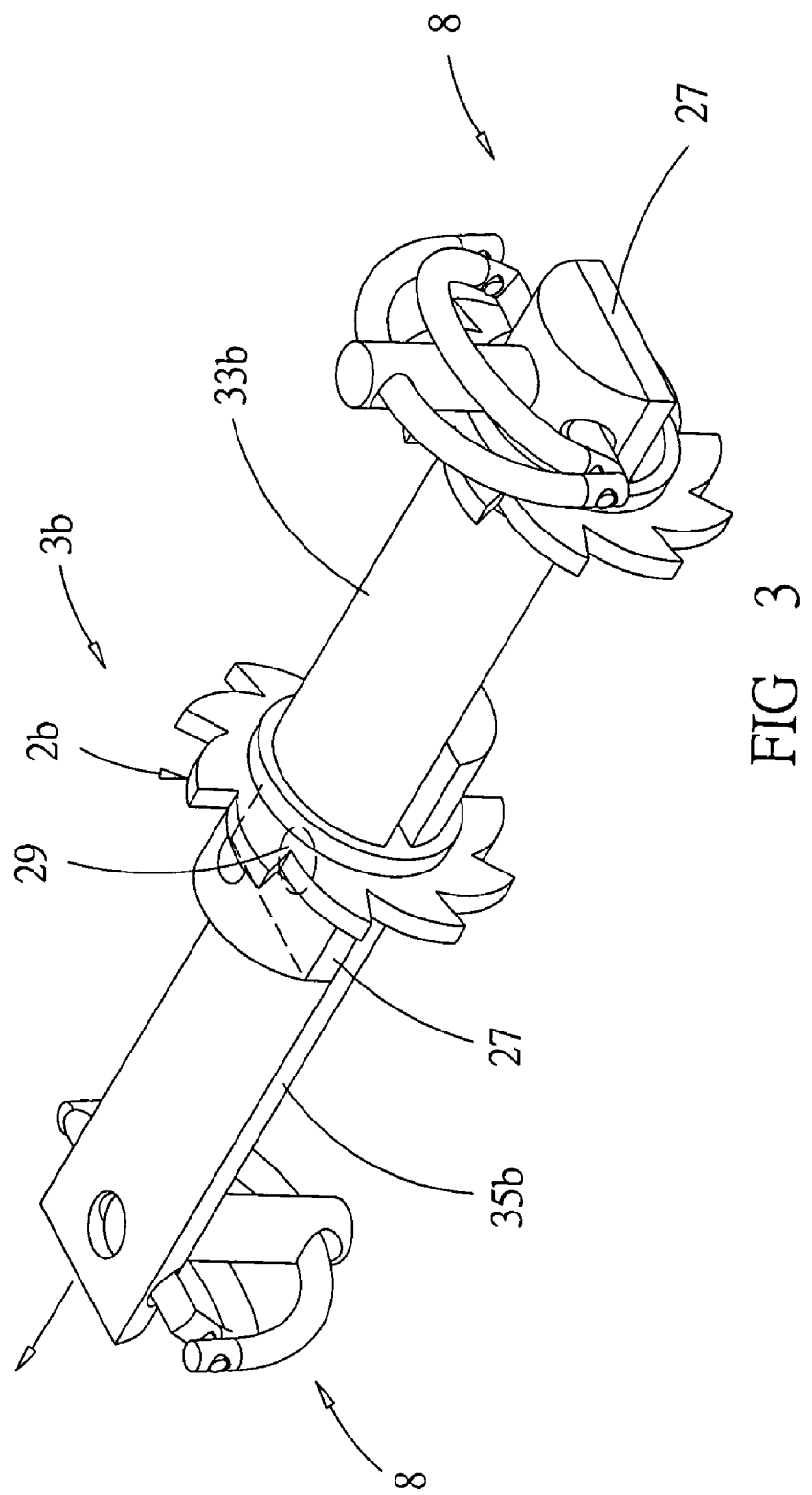
FIG. 3 is a schematic illustration of the ratchet wheels and roll of the present invention in the second embodiment.

Referring to FIG. 3, the present invention in a second embodiment has two ratchet wheels 2b and a roll 3b with first and second roll sectors 33b, 35b which are both removable. On both ends of the roll 3b, a fixing assembly 8 is attached. For mounting the roll 3b, each of the ratchet wheels 2b has a support 27 with a mounting hole 29 into which the bolt 85 is inserted, so that the roll 3b is fixed.

Figure 4:
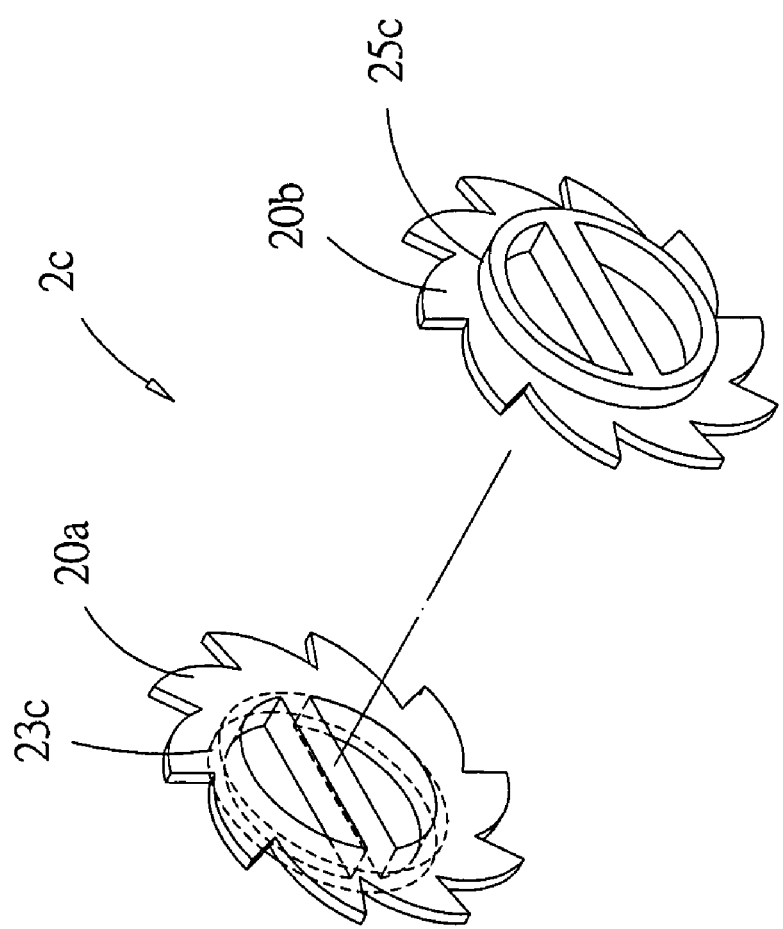
FIG. 4 is a schematic illustration of one of the ratchet wheels of the present invention in the third embodiment.
Figure 5:
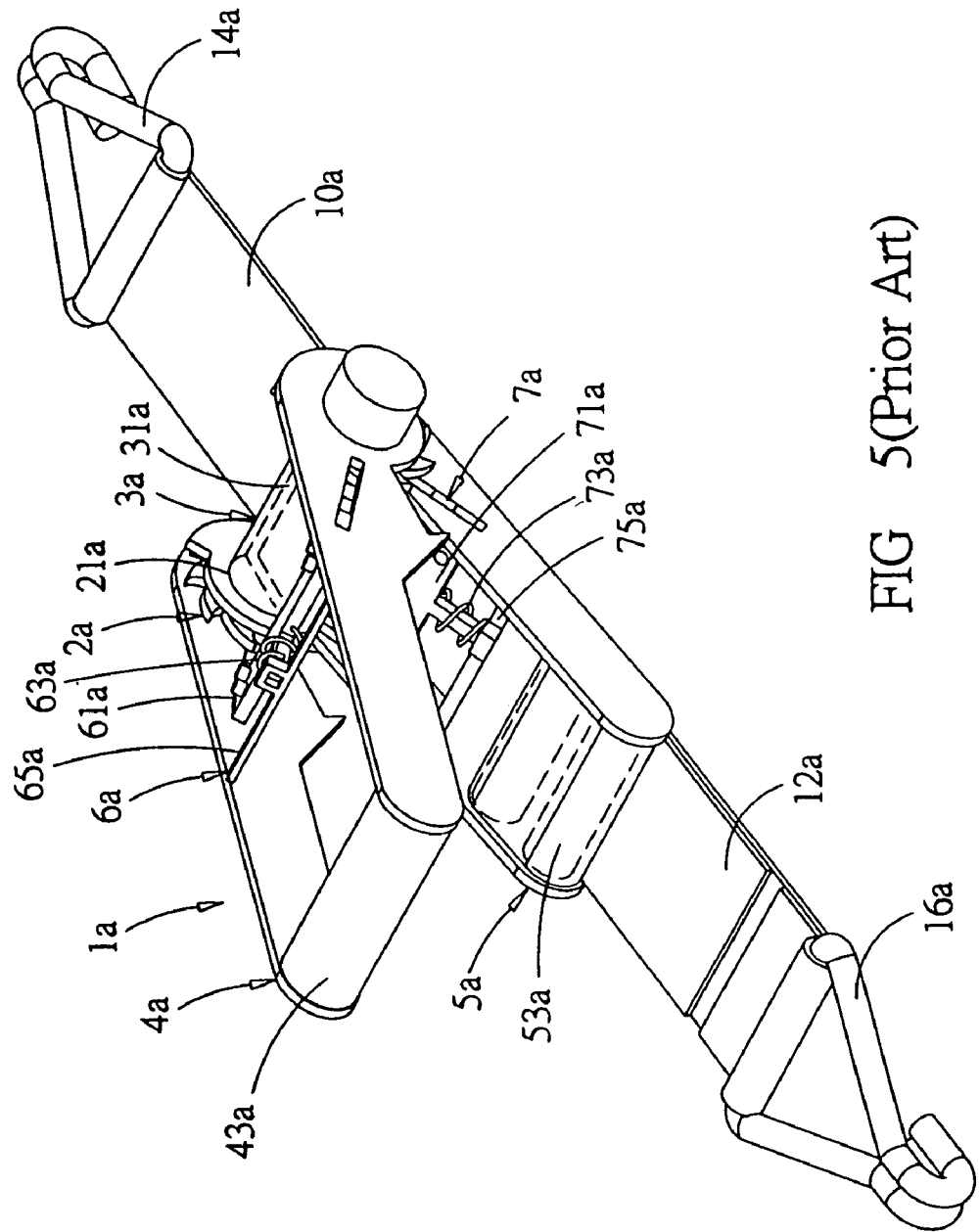
FIG. 5 is a perspective view of a conventional binding device.

Referring to FIG. 4, for saving manufacturing cost and more convenient production, the present invention in a third embodiment has ratchet wheels 2c, each comprising an inner half 20a with a circular inner protrusion 23c and an outer half 20b with a circular outer protrusion 25c.

The present invention offers the following advantages:

1. Fast mounting and dismounting of belts;

2. an extended range of applications;

3. no need for passing a belt through a gap and pulling out a belt therefrom;

4. saving manufacturing cost.

While preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

The invention claimed is:

1. A binding device, comprising:
    a first ratchet wheel and a second ratchet wheel, each having a plurality of mounting openings;
    a roll, further comprising a plurality of roll sectors that are respectively mounted in said mounting openings of said first and second ratchet wheels, with at least one roll sector being removable;
    a lever, connected with said first ratchet wheel;
    a frame, connected with said second ratchet wheel;
    an upper blocking assembly, mounted on said lever, unidirectionally blocking said second ratchet wheel from turning; and
    a lower blocking assembly, mounted on said lever, unidirectionally blocking said first ratchet wheel from turning;
    wherein each of said roll sectors are axially removable independently of the other roll sectors; said roll comprises two roll sectors which each have a free end and are fixed to each other by a compound fixing assembly; and
    wherein said compound fixing assembly further comprises
        a transverse hole, passing through said free end of said first roll sector; a first fixing hole, passing through said free end of said first roll sector, oriented perpendicularly to said transverse hole;
        a second fixing hole, passing through said free end of said second roll sector and aligned with said first fixing hole;
        two first pins, entering said transverse hole from opposite ends thereof;
        a handle, having a U shape and having ends to which said first pins are respectively attached, so that said first roll sector is readily manually moved, having lever holes close to said ends thereof;
        a connecting piece, having a U shape and having ends with end holes, through which second pins pass, which in turn pass through said lever holes; and a bolt, passing through said first fixing hole of said first roll sector and having a free end with a mounting hole, passed through by said connecting piece.

2. The binding device of claim 1, wherein said first and second ratchet wheels each comprise an inner half with an inner protrusion and an outer half with an outer protrusion.

* * * * *